(12) United States Patent
Minerbo et al.

(10) Patent No.: US 6,509,738 B1
(45) Date of Patent: Jan. 21, 2003

(54) ELECTROMAGNETIC INDUCTION WELL LOGGING INSTRUMENT HAVING AZIMUTHALLY SENSITIVE RESPONSE

(75) Inventors: Gerald N. Minerbo, Missouri City, TX (US); Brian Clark, Sugar Land, TX (US); Shu-Kong (Steve) Chang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 194 days.

(21) Appl. No.: 09/617,528

(22) Filed: Jul. 14, 2000

(51) Int. Cl.$^7$ .................................................. G01V 3/28
(52) U.S. Cl. ........................................................ 324/339
(58) Field of Search ................................ 324/339, 241, 324/207.18, 207.19, 356, 359

(56) References Cited

U.S. PATENT DOCUMENTS

| | | | |
|---|---|---|---|
| 3,609,521 A | 9/1971 | Desbrandes | 324/343 |
| 3,808,520 A | 4/1974 | Runge | 324/243 |
| 4,302,722 A | 11/1981 | Gianzero | 324/339 |
| 4,302,723 A | 11/1981 | Moran | 324/343 |
| 4,360,777 A | 11/1982 | Segesman | 324/339 |
| 4,651,101 A | 3/1987 | Barber et al. | 324/339 |
| 4,785,247 A | 11/1988 | Meador | 324/338 |
| 4,827,216 A * | 5/1989 | Grimson | 324/241 |
| 4,857,852 A | 8/1989 | Kleinberg et al. | 324/339 |
| 4,873,488 A | 10/1989 | Barber et al. | 324/339 |
| 4,980,643 A | 12/1990 | Gianzero et al. | 324/339 |
| 5,095,272 A | 3/1992 | Sinclair | 324/339 |
| 5,339,036 A | 8/1994 | Clark et al. | 324/338 |
| 5,426,368 A | 6/1995 | Benimelli et al. | 324/366 |
| 5,442,294 A | 8/1995 | Rorden | 324/339 |
| 5,467,832 A | 11/1995 | Orban | 175/45 |
| 5,508,616 A | 4/1996 | Sato et al. | 324/343 |
| 5,530,358 A | 6/1996 | Wisler et al. | 324/338 |
| 5,594,343 A | 1/1997 | Clark | 324/338 |
| 5,668,475 A | 9/1997 | Orban et al. | 324/339 |
| 5,892,460 A | 4/1999 | Jerabek | 340/856.4 |
| 6,100,696 A | 8/2000 | Sinclair | 324/339 |

FOREIGN PATENT DOCUMENTS

| | | |
|---|---|---|
| EP | 0163574 A2 | 12/1985 |
| GB | 2287324 A | 9/1995 |
| JP | 58021504 * | 2/1983 |

OTHER PUBLICATIONS

R. Fagin et al., *MWD Resistivity Tool Guides Bit Horizontally in Thin Bed*, Oil and Gas Journal, Dec. 9, 1991.

* cited by examiner

Primary Examiner—Edward Lefkowitz
Assistant Examiner—Reena Aurora
(74) Attorney, Agent, or Firm—Victor H. Segura; Brigitte L. Jeffery

(57) ABSTRACT

An induction logging instrument is disclosed which includes at least one induction transmitter arranged as an axial magnetic dipole and at least one differential axial magnetic dipole receiver disposed at a selected axial distance from the at least one induction transmitter. In one embodiment, the receiver includes a pair of coils, each wound on an axis substantially parallel to an axis of the instrument. Each of the coil axes is displaced from the instrument axis by a substantially equal lateral distance in opposite directions. Each of the pair of coils is disposed at substantially the same axial position along the instrument, and the coils are interconnected in inverse series. In another embodiment, the receiver includes two pairs of coils, each wound on an axis substantially parallel to the axis of the instrument. Each of the coil axes in each pair is displaced from the instrument axis by a substantially equal lateral distance an in opposed directions. The pairs are substantially orthogonal to each other. Each of the coils is disposed at substantially the same axial position along the instrument, and the coils in each pair are connected to circuits adapted to determine a difference between signals induced in each of the coils.

42 Claims, 11 Drawing Sheets

(A-A´)

(B-B´)

(A-A´)

ELECTROMAGNETIC INDUCTION WELL LOGGING INSTRUMENT HAVING AZIMUTHALLY SENSITIVE RESPONSE

BACKGROUND OF THE INVENTION

1. Field of the Invention

This invention relates to the field of well logging, and more particularly to measurements of electrical conductivity of earth formations penetrated by a wellbore. More particularly, the invention relates to conductivity measuring instruments which are azimuthally sensitive.

2. Background of the Art

Measurements of selected properties of earth formations penetrated by a wellbore are typically recorded with respect to the depth within the borehole at which they are made. The records are commonly referred to as. "well logs". Properties of interest of the earth formations are derived from acoustic, electromagnetic, nuclear and other types of measurements. The measurements are typically obtained by conveying a measuring instrument or "sonde" along the wellbore by attaching the instrument to one end of an electrical cable ("wireline") and extending and retracting the cable by means of a winch or other spooling device located at the surface of the earth. Using the electrical cable as the means for instrument conveyance, the measurements of the formation properties are obtained subsequent to the drilling of the wellbore.

Various drilling parameters such as weight and torque on a drill bit used to drill the wellbore are typically measured during the actual drilling of the wellbore. In addition, formation properties, such as those previously described that are made by wireline conveyed instruments, are also measured during the drilling process rather than subsequent to drilling as in wireline logging operations. These techniques are usually referred to as measurement-while-drilling (MWD) and logging-while-drilling (LWD), respectively.

Drilling techniques known in the art include drilling wellbores from a selected geographic position at the earth's surface, along a selected trajectory. The trajectory may extend to other selected geographic positions at particular depths within the wellbore. These techniques are known collectively as "directional drilling" techniques. One application of directional drilling is the drilling of highly deviated (with respect to vertical), or even horizontal, wellbores within and along relatively thin hydrocarbon-bearing earth formations (called "pay zones") over extended distances. These highly deviated wellbores are intended to greatly increase the hydrocarbon drainage from the pay zone as compared to "conventional" wellbores which "vertically" (substantially perpendicularly to the layering of the formation) penetrate the pay zone.

In highly deviated or horizontal wellbore drilling within a pay zone, it is important to maintain the trajectory of the wellbore so that it remains within a particular position in the pay zone. Directional drilling systems are well known in the art which use "mud motors" and "bent subs" as means for controlling the trajectory of a wellbore with respect to geographic references, such as magnetic north and earth's gravity (vertical). Layering of the formations, however, may be such that the pay zone does not lie along a predictable trajectory at geographic positions distant from the surface location of the wellbore. Typically the wellbore operator uses information (such as LWD logs) obtained during wellbore drilling to maintain the trajectory of the wellbore within the pay zone, and to further verify that the wellbore is, in fact, being drilled within the pay zone. Techniques known in the art for maintaining trajectory are described for example in, R. Fagin et al, *MWD resistivity tool guides bit horizontally in thin bed*, Oil and Gas Journal, Dec. 9, 1991. The technique described in this reference is based upon LWD conductivity sensor responses. If, as an example, the conductivity of the pay zone is known prior to penetration by the wellbore, and if the conductivities of overlying and underlying zones provide a significant contrast with respect to the pay zone, a measure of formation conductivity made while drilling can be used as a criterion for "steering" the wellbore to remain within the pay zone. More specifically, if the measured conductivity deviates significantly from the conductivity of the pay zone, this is an indication that the wellbore is approaching, or has even penetrated, the interface of the overlying or underlying earth formation. As an example, the conductivity of an oil-saturated sand may be significantly lower than that of a typical overlying and underlying shale. An indication that the conductivity adjacent the wellbore is increasing can be interpreted to mean that the wellbore is approaching the overlying or the underlying formation layer (shale in this example). The technique of directional drilling using a formation property measurement as a guide to trajectory adjustment is generally referred to as "geosteering".

In addition to electromagnetic measurements, acoustic and radioactive measurements are also used as means for geosteering. Again using the example of an oil producing zone with overlying and underlying shale, natural gamma radioactivity in the pay zone is generally considerably less than the natural gamma ray activity of the shale formations above and below the pay zone. As a result, an increase in the measured natural gamma ray activity from a LWD gamma ray sensor will indicate that the wellbore is deviating from the center of the pay zone and is approaching or even penetrating either the upper or lower shale interface.

If, as in the prior examples, the conductivity and natural radioactivity of the overlying and underlying shale formations are similar to each other, the previously described geosteering techniques indicate only that the wellbore is leaving the pay zone, but do not indicate whether the wellbore is diverting out of the pay zone through the top of the zone or through the bottom of the zone. This presents a problem to the wellbore operator, who must correct the wellbore trajectory to maintain the selected position in the pay zone.

Electromagnetic induction logging instruments used in wireline logging techniques are well known in the art for determining conductivity of formations surrounding the wellbore. See for example, U.S. Pat. No. 4,651,101 issued to Barber et al, U.S. Pat. No. 4,873,488 issued to Barber et al and U.S. Pat. No. 5,688,475 issued to Orban et al. The instruments described in these patents, generally speaking, include a transmitter coil and an array of receiver coil pairs disposed at selected positions along the instrument. Each receiver coil pair includes a main receiver coil and a "bucking" coil electrically connected to the main receiver coil. In general, the transmitter and receiver coils are in the form of magnetic dipoles having their axes substantially coaxial with the instrument axis (referred hereinafter as axial magnetic dipoles "AMD").

Electromagnetic induction well logging instruments are well suited for geosteering applications because their lateral (radial) depth of investigation into the formations surrounding the wellbore is relatively large, especially when compared to nuclear and acoustic instruments. The deeper radial investigation enables induction instruments to "see" a significant lateral (or radial) distance from axis of the wellbore. In geosteering applications, this larger depth of investigation would make possible detection of approaching formation layer boundaries at greater lateral distances from the wellbore, which would provide the wellbore operator additional time to make any necessary trajectory corrections. However, induction logging instruments are capable of resolving axial and lateral (radial) variations in conductivity of the formations surrounding the instrument, but the response of these instruments generally cannot resolve azimuthal variations in the conductivity of the formations surrounding the instrument. A limitation on geosteering ability which results from this limitation of induction logging instruments will be further explained.

A well logging instrument which provides directionally sensitive measurements would give valuable information in directional drilling and geosteering. Directional electromagnetic induction instruments having transmitter and receiver coils tilted relative to the instrument axis are being studied. One example of such an instrument is described, for example in U.S. Pat. No. 5,508,616 issued to Sato et al. The instrument described in the Sato et al patent includes transmitter coils and receiver coils inclined with respect to the instrument axis at about 30 degrees. This coil arrangement provides some degree of azimuthal sensitivity to the measurements.

More general, "triaxial" induction tools which have directionally (including azimuthally) sensitive response are disclosed in U.S. Pat. No. 3,609,521, "Electromagnetic Logging Device and Method Utilizing Three Mutually perpendicular Coils for Determining the Dip of Discontinuities in the Electrical resistivity of Underground Formations" issued to Desbrandes, U.S. Pat. No. 3,808,520 "Triple Coil Induction Logging Method for Determining Dip, Anisotropy and True Resistivity" issued to Runge, U.S. Pat. No. 4,302,722 "Induction Logging Utilizing Resistivity and Reactivity Induced Signal Components to Determine Conductivity and Coefficient of Anisotropy" issued to Gianzero, U.S. Pat. No. 4,302,723 "Apparatus and Method for determining Dip and/or Anisotropy of Formations Surrounding a Borehole" issued to Moran, U.S. Pat. No. 4,360,777 "Induction Dipmeter Apparatus and Method" issued to Segesman, U.S. Pat. No. 4,980,643 "Induction Logging Apparatus Utilizing Skew Signal Measurements in Dipping Beds" issued to Gianzero et al, and U.S. Pat. No. 5,442,294 "Conductivity Method and Apparatus for Measuring Strata Resistivity Adjacent a Borehole" issued to Rorden. Although some of these prior art disclosures show electromagnetic induction instruments having directionally sensitive response, electromagnetic induction measurements using coils oriented other than parallel to the instrument axis have proven difficult to make and use because they are of extremely sensitivity to conditions in the wellbore itself. Various configurations of transmitters and receivers of these prior art instruments are shown in FIG. 1. For example, the conventional axial magnetic dipole arrangement is identified as AMD in FIG. 1. The instrument having coils at oblique (30 degree) angles is shown as TILT in FIG. 1. A transverse magnetic dipole instrument is shown as TMD, and a cross-dipole arrangement is shown as CROSS. The various arrangements shown in FIG. 1 indicate the principal magnetic moment direction of the various transmitters and receivers on each such instrument The transmitters of the TILT, TMD, and CROSS arrangements have a magnetic dipole component which is oblique and/or perpendicular to the axis of the instrument, which results in significant axial flow of current in the wellbore. Measurements of this type are therefore highly sensitive to conditions in the borehole, in particular to decentralization of the instrument in the borehole. According to J. H. Moran, and S. Gianzero, in *Effects of Formation Anisotropy on Resistivity-Logging Measurements*, Geophysics, vol. 44, No. 7, July 1979, pp. 1266–1286, "with horizontal magnetic dipoles, in practice formation and borehole heterogeneities will pose significant difficulties . . . Borehole effects probably make such a tool impractical."

The desirability of being able to directionally resolve the resistivity of earth formations is illustrated in FIGS. 2a and 2b. In FIG. 2a a pay zone, or target zone, is shown at 16. It is desired, in this example, that the trajectory of a wellbore 10 is maintained within the target zone 16. Zones above 12 and zones below 14 the target 16 can be shale or any other formation which is not economically productive. In the example of FIG. 2a, the upper boundary 15 and lower boundary 17, respectively, between the target zone 16 and the zone above 12 and zone below 14 divert upward in the general direction of the wellbore 10 trajectory. An opposite diversion of the zone above and zone below is shown in FIG. 2b. Conventional electromagnetic induction measuring devices (and most LWD resistivity sensors known in the art) respond to the change in overall conductivity around the wellbore 10 as the wellbore approaches, and then penetrates one of the shale zones (either 14 in FIG. 2a or 12 in FIG. 2b), but such conventional induction resistivity measuring devices are unable to resolve which of the zones (either 14 in FIG. 2a or 12 in FIG. 2b) is actually being approached or penetrated by the wellbore if the induction instrument responses of the zones 14, 12 are similar.

U.S. Pat. No. 5,467,832 to Orban et al discloses a method for directionally drilling a wellbore which uses a MWD subsection or "sub" which is positioned within a drill string in the immediate vicinity of the drill bit. The sub includes instrumentation which makes various measurements such as the inclination of the borehole proximate to the drill bit, the gamma ray emission from the earth formations surrounding the sub, the electrical resistivity (inverse of conductivity) of the formations surrounding the sub, and a selected drilling performance parameters. The formation measurements are used to verify that the wellbore is disposed within the formation of interest (which may be a pay zone). The sensors and measurements from the instrument shown in the Orban et al patent cannot, however, be used to determine if the wellbore is approaching the upper boundary of the zone of interest, or the lower boundary of the zone of interest if the characteristics of the overlying and underlying formations are similar.

U.S. Pat. No. 5,594,343 issued to Clark et al discloses a well logging apparatus and methods for determining electromagnetic properties of earth formations penetrated by a wellbore. The instrument described in the Clark et al '343 patent includes a plurality of transmitters, with the transmitters being asymmetrically disposed about a pair of receiving antennas. This transducer arrangement provides measurements with different lateral depths of investigation which can be used at least in part to compensate for the effects of the borehole on the measurements. Those transmitter-receiver arrangements do not have azimuthal directionality, and no methodology is disclosed in the Clark et al patent for determining the position of the instrument within a zone with respect to the overlying and underlying formations.

U.S. Pat. No. 4,785,247 issued to Meador discloses an apparatus for measuring formation conductivity while drilling. The apparatus of the Meador '247 patent includes coils arranged in a wall of a drill collar. One embodiment of the apparatus in the Meador patent includes transmitter and receiver coils disposed in a wall substantially on one side of the collar. The arrangement of coils shown in the Meador patent may provide measurements having some degree of azimuthal sensitivity, but this instrument has not been shown to be capable of assisting a wellbore operator in determining azimuthal distribution of conductivity surrounding the wellbore.

An example of an instrument which includes resistivity sensors which can resolve azimuthal variations in conductivity (or resistivity) surrounding the wellbore is described in U.S. Pat. No. 6,023,168 issued to Minerbo and assigned to the assignee of this invention. The instrument described in the Minerbo '168 patent generally makes a set of "galvanic" measurements around the circumference of the instrument at a selected axial position along the instrument. While this instrument can resolve azimuthal variations in resistivity or conductivity, the depth of investigation of this instrument is relatively limited, which would make this instrument less desirable for use in geosteering. Another limitation of the instrument in the Minerbo '168 patent is that it does not work in drilling fluids which are not electrically conductive (known in the art by such terms as "oil base mud")

Another instrument which can resolve azimuthal variations in resistivity is described, for example in U.S. Pat. No. 5,339,036 issued to Clark et al. The instrument described in the Clark et al '036 patent is suitable for use while a wellbore is being drilled. This instrument, when combined with suitable rotary orientation measuring devices, as would be used in a typical measurement while drilling (MWD) apparatus, can make resistivity measurements related to the azimuthal orientation of formations surrounding a wellbore. As is the case for the instrument in Minerbo '168, the instrument in Clark et al '036 makes galvanic resistivity measurements, which may have limited lateral investigation capability and may not work in non-conductive drilling fluids.

Techniques for using some of the foregoing resistivity measuring devices for geosteering are described, for example, in *Innovative Use of BHAs and LWD Measurements to Optimize Placement of Horizontal Laterals*, G. Farruggio et al, SPE/IADC paper no. 52825, Society of Petroleum Engineers, Richardson, Tex. (1999).

Other azimuthally sensitive resistivity measuring instruments are described in U.S. Pat. No. 5,892,460 issued to Jerabek et al, U.S. Pat. No. 5,442,294 issued to Rorden and U.S. Pat. No. 5,530,358 issued to Wisler et al. All of these references describe antenna configurations which can be used in LWD apparatus.

SUMMARY OF THE INVENTION

One aspect of the invention is an induction logging instrument is which includes at least one induction transmitter arranged as an axial magnetic dipole, and at least one differential axial magnetic dipole ("DAMD") receiver disposed at a selected axial distance from the at least one induction transmitter.

In one embodiment, the DAMD receiver includes a pair of coils. Each coil in the pair is wound on an axis substantially parallel to the axis of the instrument. Each of the coil axes is displaced from the instrument axis by a substantially equal lateral distance, and in opposed directions with respect to each other about the instrument axis. Each coil of the pair of coils is disposed at substantially the same axial position along the instrument, and the coils are connected to circuits adapted to determine a difference between signals induced in each of the coils.

In another embodiment, the DAMD receiver includes two pairs of coils, each wound on an axis substantially parallel to the axis of the instrument. Each of the coil axes in each pair is displaced from the instrument axis by a substantially equal lateral distance in opposed directions. The pairs are substantially orthogonal to each other. Each of the coils is disposed at substantially the same axial position along the instrument, and the coils in each pair are connected to circuits adapted to determine a difference between signals induced in each of the coils.

In another exemplary embodiment, the DAMD receiver includes two pairs of coils positioned similarly to the laterally displaced coils in any of the foregoing embodiments. Each pair of coils is disposed at a different axial spacing from the transmitter coil. Each pair of substantially equally displaced coils is connected to circuits which determine a difference in signal between the coils. The number of turns in each coil is selected to produce a condition of "mutual balance."

Another embodiment includes, in addition to any of the foregoing, an array of DAMD receivers each positioned at a selected axial spacing from the transmitter.

Another embodiment includes a conventional AMD induction transmitter, and at least one conventional axial magnetic dipole ("AMD") receiver along with the one or more DAMD receivers.

Yet another embodiment includes an AMD induction transmitter, an array of AMD receivers and one or more DAMD receivers.

All the foregoing embodiments may have as alternatives the substitution of one or more DAMD transmitters for the AMD transmitter. In a particular example of this embodiment, the induction logging instrument includes at least on AMD transmitter, at least one DAMD transmitter, and an array of AMD receivers. When the AMD transmitter is energized, the receivers detect conventional AMD signals. When the DAMD transmitter is energized, the receivers detect DAMD signals.

Other aspects and advantages of the invention will be apparent from the description which follows.

DETAILED DESCRIPTION

1. Example Configurations of Well Logging Instruments According to the Invention The invention is based, in general principle of operation, on electromagnetic induction well logging instruments. Advantages offered by using electromagnetic induction measurements in a logging instrument adapted to measure formation resistivity include generally greater lateral (radial) depth of investigation than other types of resistivity measuring devices. The greater lateral depth of investigation may provide a wellbore operator with more timely information about the approach of a formation boundary by a wellbore, as will be further explained. The advantages of using electromagnetic induction measurements also include that the measurements can be made in non-conductive drilling fluids.

Figures 3A, 3B, 4A, 4B:
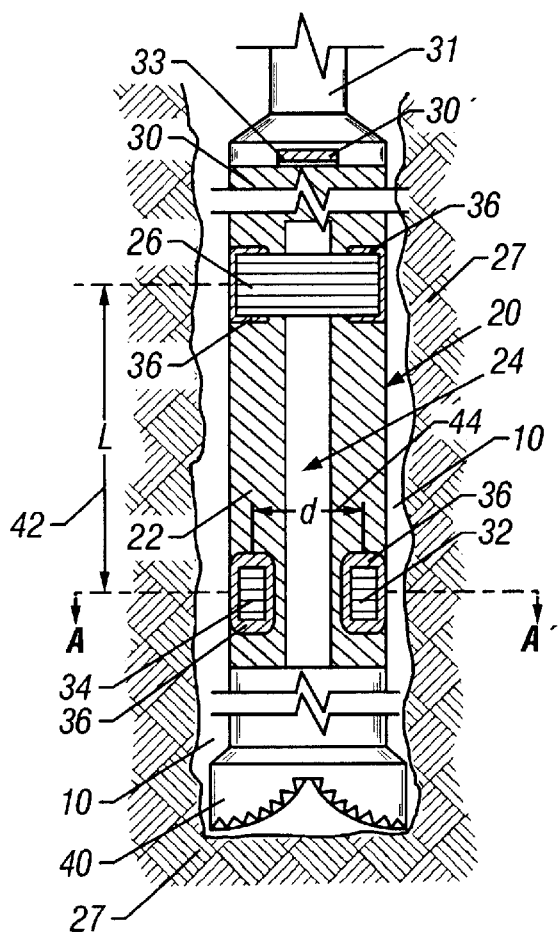
FIG. 3a is an axial cross sectional view of one example of an instrument according to the present invention which is adapted for logging-while-drilling operations.
FIG. 3b is a radial cross sectional view of the receiver coils of one example of an instrument according to the present invention adapted for logging-while-drilling operations.
FIG. 4a is an axial cross sectional view of an example instrument according to the present invention which is adapted for wireline logging operations.
FIG. 4b is a radial cross sectional view of the receiver coils of an example instrument according to the present invention adapted for wireline logging operations.

In one embodiment of the invention, an induction logging instrument includes a differential axial magnetic dipole ("DAMD") receiver. The instrument in this embodiment includes a conventional (axial magnetic dipole) induction transmitter coil and may include one or more DAMD receivers. FIG. 3a shows a cross-sectional view, along the instrument axis, of this embodiment of the instrument 20. This embodiment is particularly suitable for logging while drilling ("LWD") operations. The instrument 20 is part of a drilling tool assembly including of one or more LWD instruments 30 connected to a rotatable drill string 31, by a means of a drill collar 33. The entire drill string 31 is disposed within a wellbore 10 drilled through earth formations. The drill string 31 penetrates earth formations 27 by the rotary cutting action of a drill bit 40. The instrument 20 is preferably incorporated within a drill collar 22 and is disposed as close as is practical to the drill bit 40. Apparatus for rotating the drill string 31 (e.g. a "drilling rig") from the surface of the earth is not shown, but is well known in the art. A conventional (axial magnetic dipole) induction logging transmitter 26, which in this embodiment is an axially wound coil, is mounted within a suitable cavity formed in the exterior wall of the drill collar 22. The transmitter coil 26, as is the case for most conventional axial magnetic dipole ("AMD") induction transmitters, is generally wound with its axis substantially coincident with the axis of the instrument 20. The transmitter coil 26 may be imbedded within a non-conducting material 36 such as hard rubber or the like which fills the cavity and electrically insulates the coil 26 from the collar 22.

This embodiment of the invention includes two receiver coils, 32 and 34, which preferably have substantially identical electromagnetic response characteristics. The receiver coils 32, 24 are axially spaced the same distance L (identified by the numeral 42) from the transmitter coil 26, and are laterally displaced from each other, away from being coaxial with the instrument 20, by a distance, d, as identified by the numeral 44. The receiver coils 32, 34 are each laterally displaced from the axis 24 by d/2 in opposite directions from each other (azimuthally spaced by 180 degrees). The receiver coils 32, 34 are connected in series with opposite polarity. The purpose of interconnecting the coils in this manner is to provide a total output which represents the difference between the signals induced in each of the coils. Other means for determining a signal difference are well known in the art, and include electronic and/or digital signal subtraction. The receiver coils 32, 34 are mounted within suitable cavities formed in the wall of the drill collar 22, and are also preferably imbedded within non-conducting material 36, which may be the same as the material imbedding the transmitter coil 26, and which also electrically insulates the receiver coils 32, 34 from the collar 22. In an embodiment suitable for use in MWD/LWD application, a flow conduit 24 passes preferably through the center of the instrument 20 to enable drilling fluid to be pumped through the instrument 20 and out through the drill bit 40 in a manner well known in the art. This embodiment of the receiver coils 32, 34, positioned and electrically connected as described, as well as other embodiments which will be explained hereinafter, may be referred to as a matter of convenience as a "DAMD receiver".

Subsection 30 contains instrumentation 30' adapted to measure the orientation of the instrument 20 at any time. Orientation can be obtained from measurements of the earth's magnetic field (such as by magnetometers) and from gravity measurements (such as by suitable accelerometers), as is well known in the art. Conductivity related measurements made by the instrument 20 are combined with the orientation measurements from the instrumentation 30' to provide an indication of the azimuthal distribution of the resistivities of the formations surrounding the instrument 20. Subsection 30 also may contain suitable circuitry (not shown separately) for energizing the transmitter 26 and detecting signals induced in the receiver coils 32, 34. The nature of the signals detected by the DAMD receiver (coils 32, 24) will be further explained.

FIG. 3b shows a top sectional view at A–A' illustrating the positioning of the receiver coils 32 and 34 with respect to each other within the recesses formed in the collar 22 and embedded within the insulating material 36.

An embodiment of an instrument according to the invention which can be used in wireline operations as well as in MWD/LWD operations is shown in an axial sectional view in FIG. 4a. The instrument 20 is enclosed within a pressure-resistant housing 50 and is suspended within the wellbore 10 (typically as part of a string of wireline instruments) by means of a cable head 54 that is electrically and mechanically connected to an armored electrical cable 55. The wellbore 10 penetrates the earth formations 27, just as in the previous embodiment. The instrument in this embodiment comprises a conventional induction transmitter coil 26' coaxially aligned with an instrument mandrel 52. Two DAMD receivers, preferably spaced orthogonally (on 90 degree azimuthal centers), are used in this embodiment of the invention because wireline instruments generally do not operationally rotate within the wellbore 10. In this embodiment, the two DAMD receivers each include a pairs of coils arranged similarly to the coils in the previous embodiment. Two of the DAMD receiver coils 32' and 34' are shown in FIG. 4a. Coils 32' and 34' and, the other two coils 33' and 35' of this embodiment, are shown in a top sectional view B–B' in FIG. 4b. All the coils 32', 33', 34', 35' are preferably disposed at substantially the same axial position on the instrument 20.

In the embodiment shown in FIG. 4b, the response of each of the four receiver coils is preferably assigned a weight, cos α, sin α, -cos α, and -sin α, respectively, to select the direction, α, of maximum positive response, as will be further explained, where α represents an azimuthal angle defined in a plane perpendicular to the axis of the instrument. The weighting factors can be generated electronically or by numerical processing of the output of the respective receiver coils. As previously explained, in order to obtained the desired directional information about the orientation of the formations, some knowledge of the instrument orientation is needed. This information and can be determined from the previously described measurements of the earth's magnetic field and measurements of earth's gravity. The application of the weighting factors, as just described, to a four-coil arrangement according to this embodiment of the invention can also be used with an alternative embodiment of an instrument suitable for MWD/LWD operation. The reason for providing such an embodiment to an MWD/LWD suitable instrument according to the invention, is to provide an indication of the azimuthal distribution of conductivity when the LWD instrument is not rotating. As is known in the art, this condition occurs in wellbore drilling with a "mud motor" during an operation referred to as "slide drilling". The mud motor operates by the flow of fluid through the drill string and provides power to turn the drill bit (40 in FIG. 3a).

2. Principle of Operation of the Invention

The measurement made by the various receivers and receiver coils in the various embodiments of the instrument according to the invention is anti-symmetric under reflections x→-x in Cartesian coordinates where the receiver coils are positioned laterally (radially) at x=±d/2 from being coaxial with the axis of the transmitter coil. It should be clearly understood that the geometry of the coil arrangements described herein is a matter of convenience for a designer of an instrument according to the invention, and that references to the axis of the physical instrument or instrument housing, drill collar or the like are included only to provide practical examples of instruments which function according to the invention. The manner in which the invention operates depends generally on the arrangement of transmitter and receiver coils with respect to each other, and does not depend on the arrangement of the transmitters and receivers with respect to the axis of the instrument housing, sub, sonde or drill collar. Accordingly, the invention should not be limited to any coil arrangement defined with respect to any lateral position with respect to the instrument axis The anti-symmetric aspect of the measurements made by the instrument of the invention permits, among other things, determination of whether the instrument is approaching or crossing into a formation defining an upper boundary of a zone (or target formation) of interest, or is approaching or crossing into a formation defining a lower boundary of the zone of interest. As will be further explained, the DAMD receivers generate a signal of one polarity when the instrument approaches one boundary, and generates a signal of the opposite polarity when the other boundary is approached. The nature of these signals not only can inform the wellbore operator that the wellbore trajectory is diverging from a desired path, but may give the wellbore operator time to take remedial action to redirect the wellbore along a desired trajectory.

The Born approximation is useful in understanding the response of the instrument of the invention, although, strictly speaking, the Born approximation is accurate only for low contrast perturbations from a homogeneous medium as discussed in *Accuracy and Validity of the Born and Rytov Approximations*, J. B. Keller, Journal of the Optical Society of America, vol. 59, no. 6, pp. 1003–1004 (1969). To define an instrument "sensitivity factor", consider first isotropic conductivity distributions that are exactly zero in half-space x<0. A complex voltage V induced in a receiver coil for a unit current flowing in the transmitter coil can be determined by the expression:

$$V(\sigma)=V_b+\int_{x>0}G_b(r)(\sigma(r)-\sigma_b)d^3r$$

where $\sigma_b$ represents a constant background conductivity. It can be shown that:

$$\int G_b(r)d^3r=(d/d\sigma_b)V_b$$

The instrument sensitivity factor, K, is defined as:

$$K=\lim_{\sigma_b \to 0}(d/d\sigma_b)V_b$$

and the apparent conductivity, $\sigma_a$, is defined as:

$$\sigma_a=V[\sigma]/K$$

Figure 5:
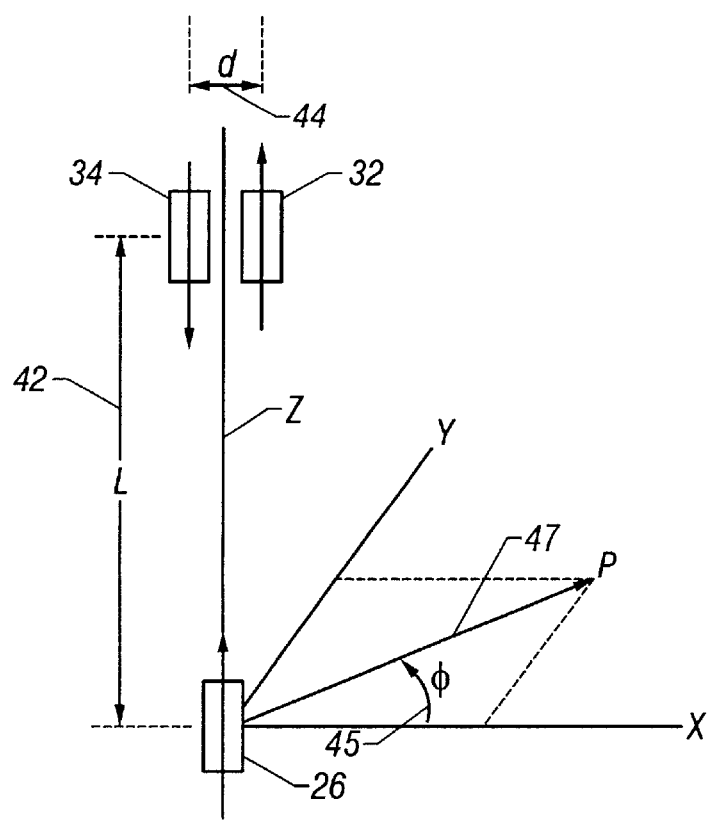
FIG. 5 illustrates the geometry used to describe the induction instrument according to the invention.

The geometry used to describe the instrument of the LWD (the first) embodiment of invention is shown in FIG. 5, where the two receiver coils 32 and 34 are axially spaced a distance 42 (L) from the transmitter coil 26. The axis of the instrument (which in this embodiment is coaxial with the transmitter) is defined as the z axis, with the transmitter serving as the origin for the Cartesian coordinate system. The x-y plane in FIG. 5 contains a vector ρ which is identified by numeral 47 and which locates a point on the x-y plane. The rotation of ρ from the x-axis is defined by an angle φ, identified by numeral 45.

Figure 6:
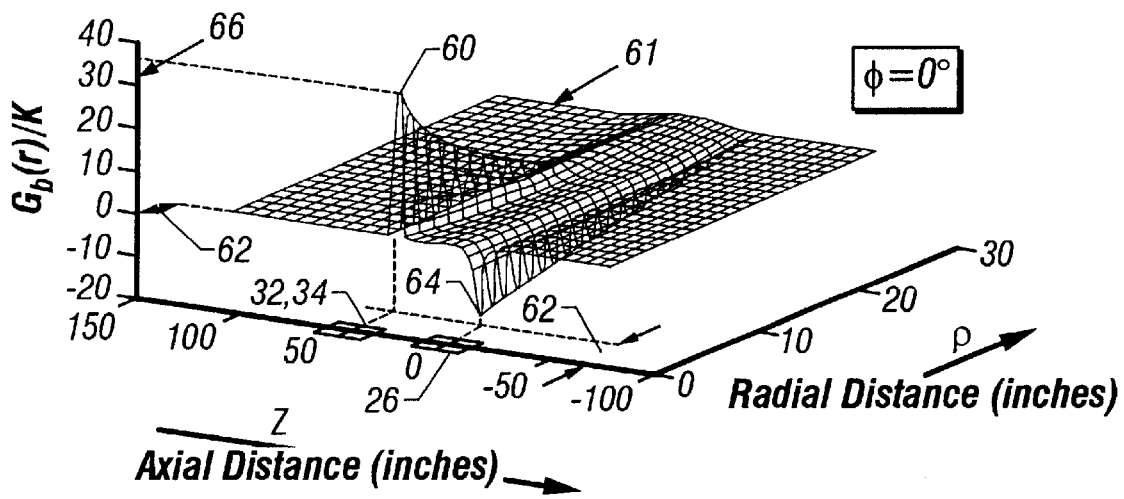
FIG. 6 illustrates an instrument response function in the x-z plane ($\phi=0$).

A plot of a surface 61 representing the real part of $G_b(r)/K$ in the x-z plane (φ=0°) is shown in FIG. 6, where the z-axis represents axial distance and the ρ-axis represents radial distance from the axis of the instrument. In this example, the spacing L between the transmitter coil 36 and the receiver coils 32, 34 is 40 inches, and the lateral separation d between the axes of the receiver coils 32 and 34 is 1.45 inches. The frequency of operation is 20 kilohertz (kHz) and the background conductivity $\sigma_b$ is 0.01 S/m. It should be understood that these frequencies and spacings are representative, and that other suitable frequencies and spacings can be used in an instrument according to the invention. The surface 61 is displaced along the ρ (radial distance) axis by distance 62 due to the finite (non-zero) diameter of the coils. There is a positive response peak 60 centered at the axial position of the receiver coils 32, 34 (at z=L=40 inches), with a maximum value 66 of approximately 35 on the signal axis scale. A negative response peak 64 is centered on the z-axis at about the axial position of the transmitter coil 36, which by definition is located at Z=0.

Figure 7:
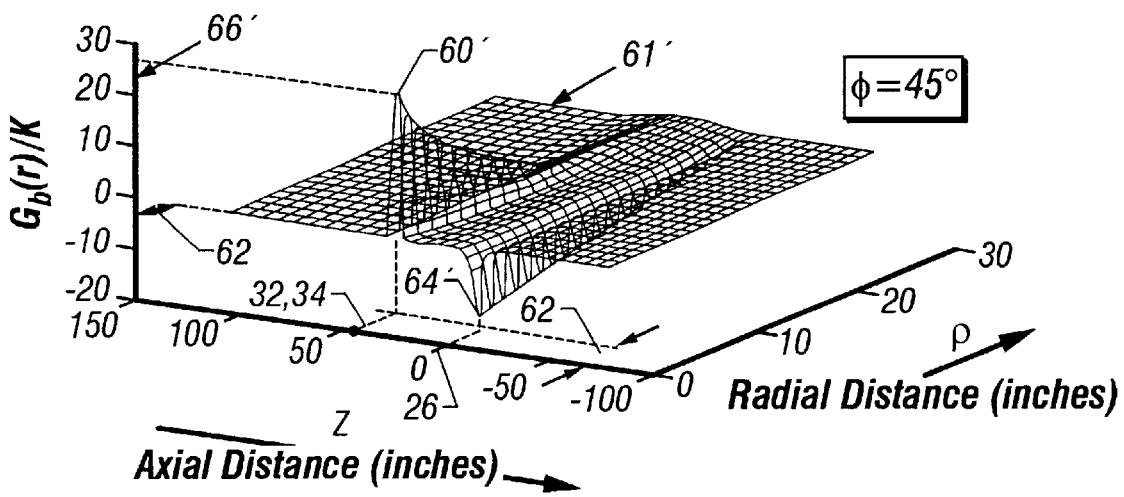
FIG. 7 illustrates an instrument response function in the x-ρ plane ($\phi=45°$).

A plot of the same response function in the azimuthal plane (where φ=45°), represented by a surface 61' is shown in FIG. 7. The shape of the surface 61' is essentially the same as the shape of the surface 61 in FIG. 6, confirming that the instrument response has the form $G_b(\rho, \phi, z) = P(\rho,z) \cos \phi$. More specifically, there is a positive response peak 60' centered at the axial position of the receiver coils 32, 34 (at z=L=40 inches), with a maximum value 66' of approximately 23 on the signal axis. This maximum value is approximately equal to the maximum of the previous response peak, 66 in FIG. 6, multiplied by cos φ=cos 45°, or 35×0.707=25. A negative response peak 64' is again centered on the z-axis at about the axial position (z=0) of the transmitter coil 36.

Figure 8A:
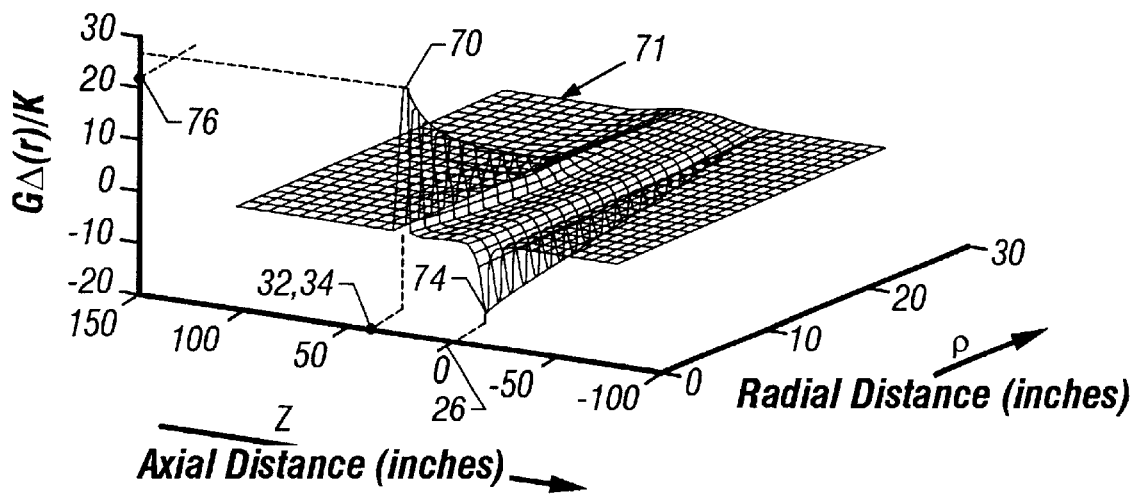
FIG. 8a illustrates the instrument response function integrated over $90 \geq -\phi \geq -90$ degrees.

FIG. 8a shows the response function averaged over the azimuthal angle 90≧φ≧0 degrees. A peak 70, with a maximum value indicated by the numeral 76, again appears at the axial position of the receiver coils 32, 34 at z=L=40 inches, as would be expected from the results shown in FIGS. 6 and 7, and a negative peak 74 appears at the axial position 26 of the transmitter coil (at z=0).

Figure 1:
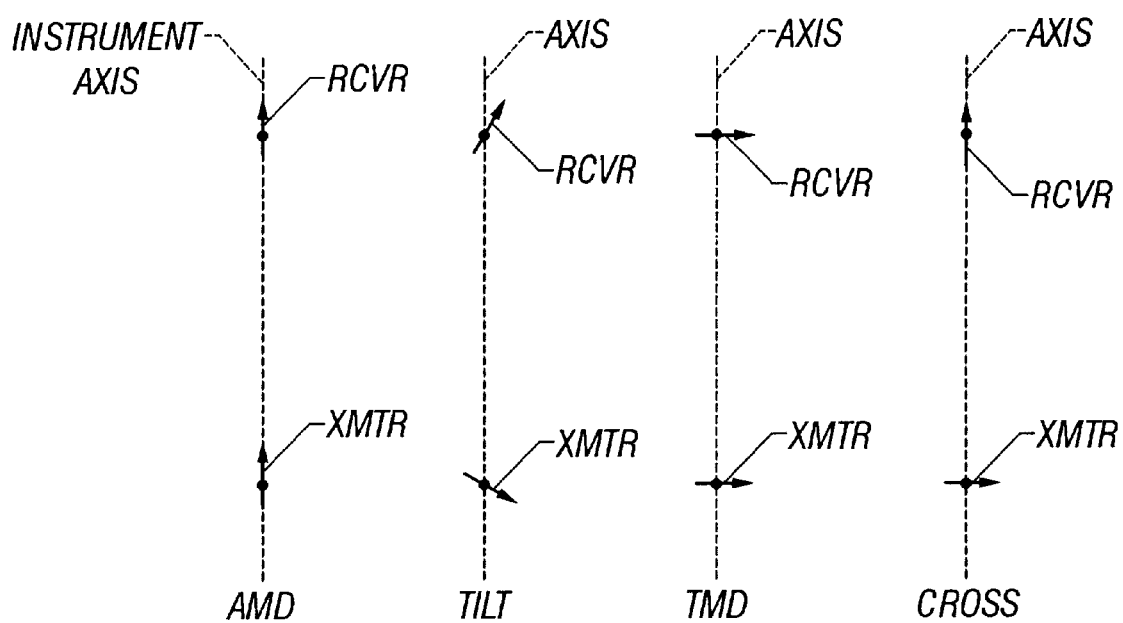
FIG. 1 illustrates several exemplary coil combinations used in prior art induction logging systems.
Figure 8B:
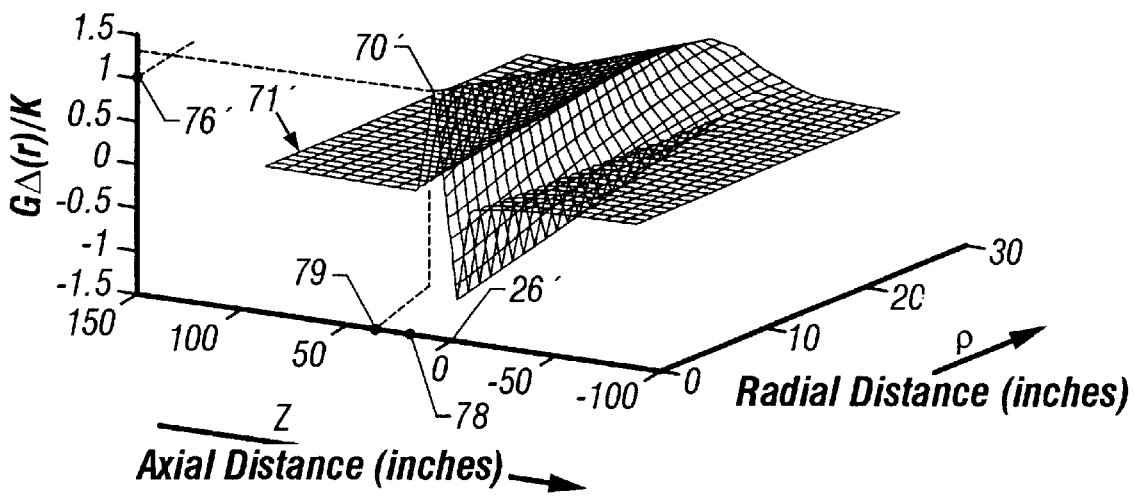
FIG. 8b illustrates a reference prior art axial magnetic dipole instrument response function integrated over $-90 \geq -\phi \geq -90$ degrees.

FIG. 8b shows, for comparison, a surface 71' representing the response function of a prior art (AMD) induction logging instrument (see FIG. 1) with a main receiver coil at L=39 inches and identified by the numeral 79 on the z-axis, and a bucking coil at L=27 inches and identified by the numeral 78 on the z-axis. A transmitter 26' is again located, by definition, at z=0.0 inches on the z-axis. The transmitter operating frequency is 26 kHz. A peak 70' is centered about a point 79 which is in the vicinity of the location of the receiver coil. As previously explained, prior art AMD induction logging instruments generally include transmitters and receivers which are substantially coaxial. The response shown in FIG. 8b is for such a prior art AMD induction logging instrument.

In comparing FIGS. 8a and 8b, it is apparent that the radial depth of investigation (indicated by the ρ axis) of the instrument of the invention is somewhat less than comparable prior art AMD induction instruments. This means that the instrument of the invention is not responsive to bed boundaries (conductivity contrasts) from as great a radial distance (from the instrument axis) as comparable prior art AMD induction instruments. However, the instrument of the invention will give new information that cannot be obtained from prior art AMD induction instruments.

Figure 9:
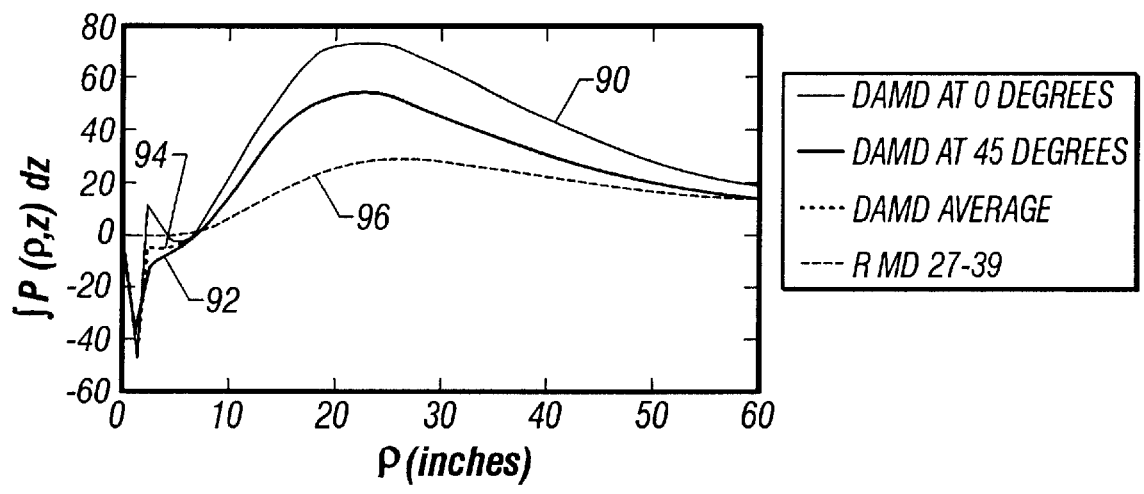
FIG. 9 illustrates radial response functions for the instrument of the invention (DAMD), and for the reference prior art induction instrument (AMD).

The radial and axial response functions for the instrument of the invention, and for the "reference" prior art AMD induction instrument are obtained by integrating the term $P(\rho,z)$ over z or ρ, respectively. Radial response functions are shown in FIG. 9, with the integral $\int P(\rho,z)dz$ plotted on the ordinate axis and ρ plotted on the coordinate axis. Curves 90, 92 and 94 represent the integrated instrument responses at φ=0 degrees, φ=45 degrees, and φ averaged over 90≧φ≧0 degrees, respectively. Curve 96 represents the reference prior art induction instrument response. "27" and "39" indicate the axial spacing of bucking and main receiving coils from the transmitter, respectively. The response of the instrument of the invention is not as radially deep as the reference prior art instrument, but it has a useful peak near ρ=21 inches and still "sees" approaching bed boundaries at usable distances from the instrument axis.

Figure 10:
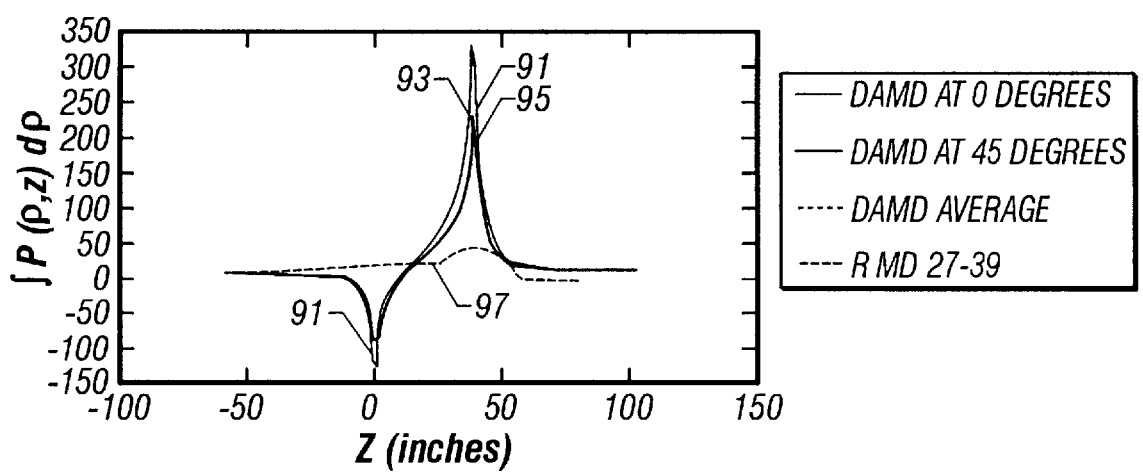
FIG. 10 illustrates axial response functions for the instrument of the invention (DAMD), and for the reference prior art induction instrument (AMD).

Axial response functions are shown in FIG. 10, with the integral $\int P(\rho, z)d\rho$ plotted on the ordinate axis and z plotted on the coordinate axis. Curves 91, 93 and 95 represent the integrated instrument responses at φ=0 degrees, 45 degrees' and φ averaged over 90 ≧φ≧0 degrees, respectively. Curve 97 represents the reference prior art AMD induction instrument response. The instrument of the invention shows a well defined, positive peak response near the axial position of the receivers (at z=40 inches), with a smaller negative peak response at the transmitter axial position (z=0).

Figure 11:
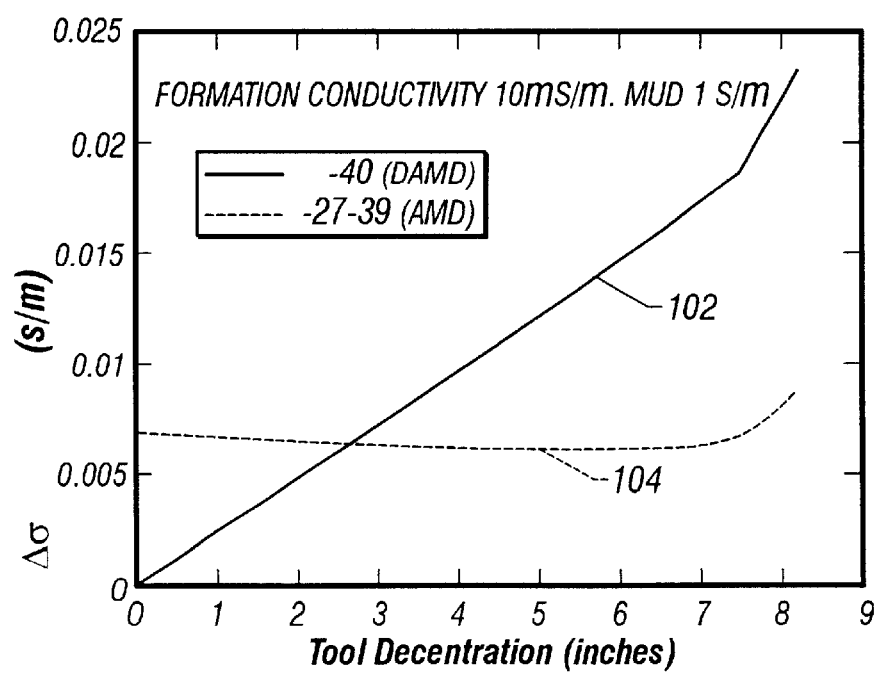
FIG. 11 illustrates eccentering dependence of the response of the DAMD instrument and of the reference prior art AMD instrument.

Now that the fundamentals of the instrument measurement according to the invention have been explained, the conductivity actually measured with the instrument of the invention in actual wellbore conditions will be explained. The measured conductivity from instrument of the invention is affected somewhat by any decentralizing of the instrument within the wellbore. Results of a sample wellbore effect calculation are shown in FIG. 11 for both the instrument of the invention and the reference prior art AMD induction instrument. Both instruments are positioned in a wellbore having a circular cross section and a 20 inch diameter, at decentralized positions along the x-axis using the coordinate system previously defined (see FIG. 5). The borehole is assumed to be filled with a fluid of conductivity 1 S/m, and is surrounded by a homogeneous isotropic formation of conductivity 0.01 S/m. Instrument decentralization (in inches) is plotted along the coordinate axis and the conductivity correction Δσ is plotted along the ordinate axis. Curve 102 represents the conductivity correction with respect to decentralization for the instrument of the invention. Curve 104 represents the conductivity correction with respect to decentralization for the reference prior art AMD instrument. Comparison of the two curves shows that for the instrument of the invention, decentralization of a few inches can be tolerated, for the example wellbore fluid and formation conductivity values herein. If the instrument of the invention is decentralized along the y-axis (see FIG. 5), then borehole correction Δσ' will be substantially equal to zero because of DAMD receiver coil symmetry about the y-axis. Further correction of any amount of wellbore effect on the measurements could be performed, for example, using operating software similar to that used for an array-type AMD induction logging instrument. See, for example, the software described in U.S. Pat. No. 5,041,975 issued to Minerbo et al.

For purposes of being able to correct for the wellbore effect, it is useful to build an instrument according to the invention having an array of DAMD receivers, each such receiver having different axial spacing L from the transmitter 26. The DAMD receivers can be in the form of coil pair as shown in FIG. 3b, or in the form of orthogonal coil pairs as shown in FIG. 4b. Other forms of DAMD receiver will be explained later herein.

Figure 12A:
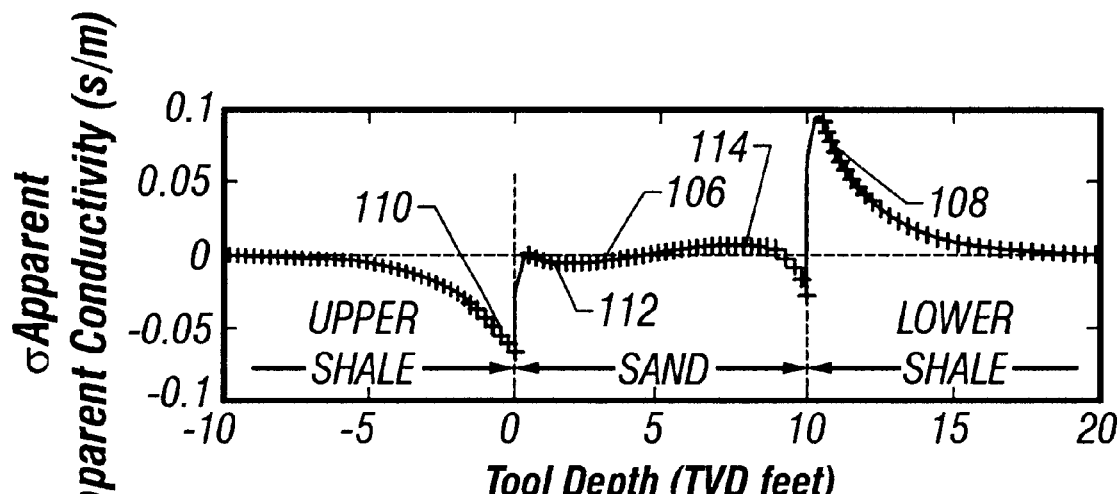
FIGS. 12a and 12b illustrates DAMD and reference AMD tool within a selected target formation and within contrasting formations disposed above and below the target formation.
Figure 12B:
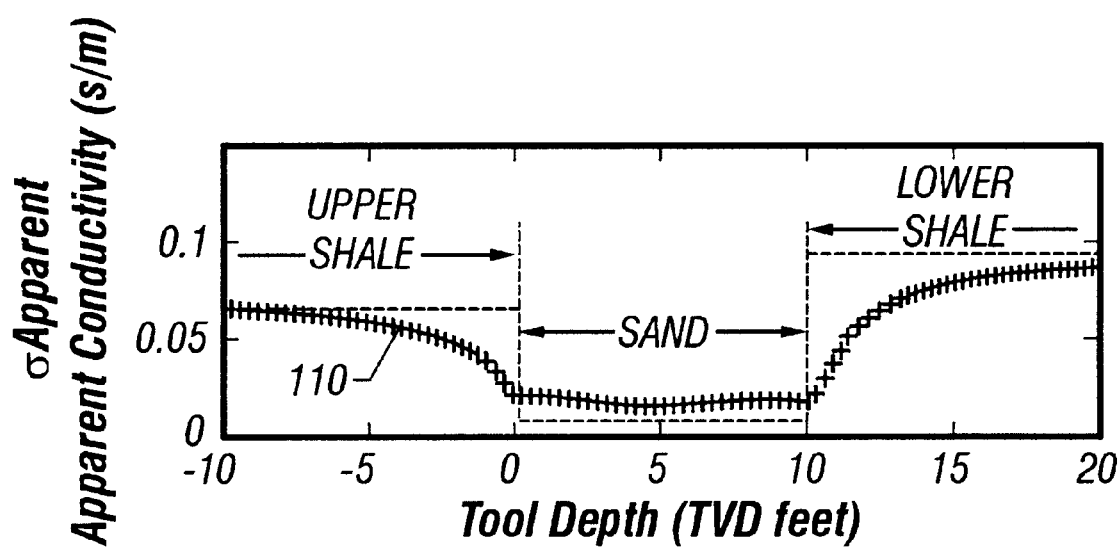

FIG. 12a illustrates an example of the response of the instrument of the invention in a substantially horizontal wellbore drilled through a 10 foot thick target (pay zone) formation with a conductivity of 0.01 S/m. The pay zone is bounded on top by a first boundary layer (e.g., shale) having a conductivity of 0.07 S/m. The pay zone in this example is bounded on the bottom by a second boundary layer having conductivity of 0.1 S/m. True vertical depth (TVD) of the wellbore plotted on the abscissa of FIG. 12a corresponds to the x-axis in FIG. 5, with x pointing downward in FIG. 12a. The apparent conductivity scale is plotted along the ordinate axis in FIG. 12a, and apparent conductivity measured by the instrument is identified by curve 106. At TVD of 11 feet, the instrument exhibits a strong positive peak 108 indicating that the instrument has entered the lower boundary layer. This scenario is shown schematically in FIG. 2b. At TVD=1 foot, the instrument response includes a negative peak 110 indicating that the instrument is in the upper boundary layer. This scenario is shown schematically in FIG. 2a. A physical measure of the x axis in the downward direction is obtained from the tool orientation sub (30' shown in FIG. 3a) thereby allowing definitive identification of instrument location in the upper or lower boundary layer even though the conductivities of these boundary layers are similar. While the example shown in FIGS. 12a and 12b is discussed in terms of horizontal wellbores and substantially horizontal earth formation layering, it should be clearly understood that the response of an instrument according to the invention does not depend on the formations or the wellbore being in any particular orientation with respect to a fixed geographic reference (i.e. earth's gravity and/or magnetic or geographic north). The response of the instrument according to the invention depends only on the orientation of the instrument with respect to any conductivity discontinuities in the formations surrounding the instrument. Accordingly, any references in the examples herein describing "horizontal" wellbores and horizontal earth formations are not meant to limit the invention to use under such circumstances or in such wellbores and formations.

It is often desirable to advance the wellbore by drilling substantially within the target formation (pay zone) which, in the example being discussed, is a 10 foot thick oil bearing sand. While operating within the target formation, the instrument of the invention generates a smaller amplitude measurement, that is positive in sign, if the instrument is operating on the lower side of the target formation. This is illustrated in region 114 of curve 106. Conversely, if the instrument is advancing along the wellbore too high within the target formation, a small negative-sign signal will be observed, as illustrated by region 112 of curve 106. The polarity of the signals can be used to indicate to the wellbore operator the relative position of the wellbore within the target formation, so that the path of the wellbore may be corrected prior to further drilling, so as to keep the wellbore trajectory near an optimal position within the target zone.

Figure 2A:
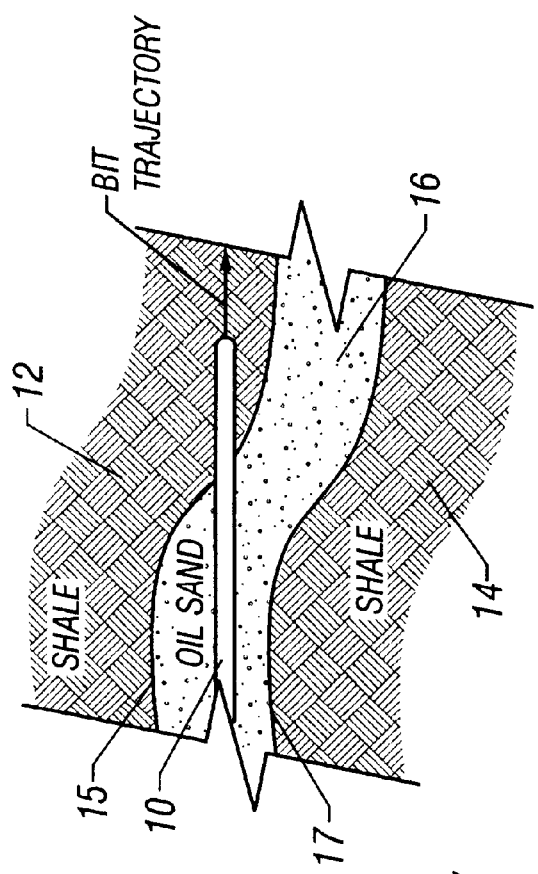
FIGS. 2a and 2b schematically illustrate an arrangement of earth formations which the present invention is able to resolve.
Figure 2B:
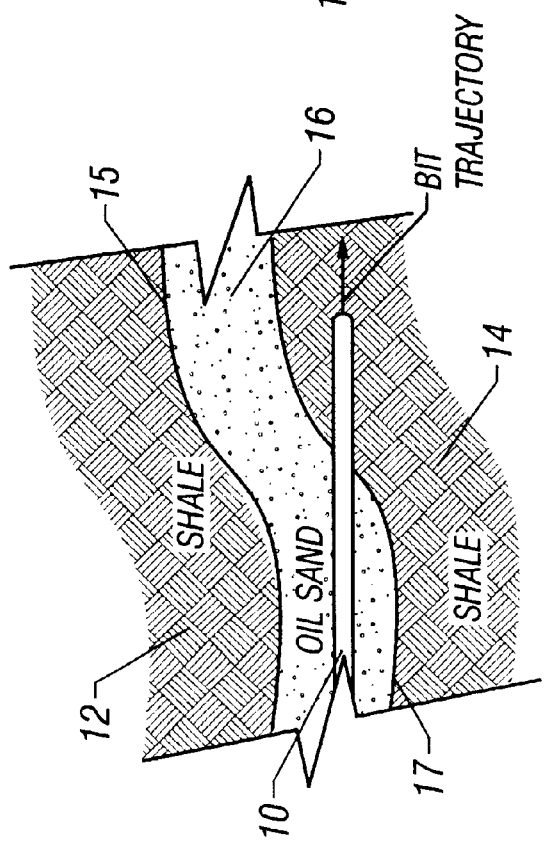

It should be noted that the true depth in the formation is most often not known very accurately, so it is not practical, for example, to compute the depth derivative of the response of a conventional induction log in a horizontal well. The instrument according to the invention provides new information, in the form of particular polarity signals not easily obtainable from prior art AMD induction logs. Curve 110 in FIG. 12b, for example, illustrates the response of the reference prior art AMD instrument through the same formation layers as shown in FIGS. 2a and 2b. Other than relatively small magnitude variations in the measured conductivities, the upper and lower boundary zones are not distinguished by the prior art AMD induction logging instrument. Using only the measurements from the prior art AMD induction logging instrument, the wellbore operator would not know which boundary formation had been penetrated by the wellbore, nor would the wellbore operator have a prior indication of which particular boundary was being approached by the wellbore.

3. Alternative Transmitter and Receiver Arrangements

Extensions to and modifications of the disclosed measurement apparatus and technique of the invention will be apparent to those skilled in the art. For example, a greater radial (lateral) depth of investigation can be obtained by increasing the axial coil spacing L between the transmitter and receiver coils. The operating frequency may be suitably adjusted when lengthening L. Increasing L will also reduce the magnitude of wellbore effects. Bucking coils can be added to the DAMD receiver coils to further reduce borehole effects and to reduce direct inductive coupling between the transmitter and receiver coils. Several AMED receiver coils can be mounted in a circle to provide cos my directionality, where m=2, 3, 4 . . . For larger values of m, the radial response of the instrument will be shallower, falling off by a factor of $\rho^{-m}$.

Because of electromagnetic reciprocity, the same effective measurement may be obtained by reversing the roles of the transmitter and receiver coils in each of the arrangements described.

Figure 13A:
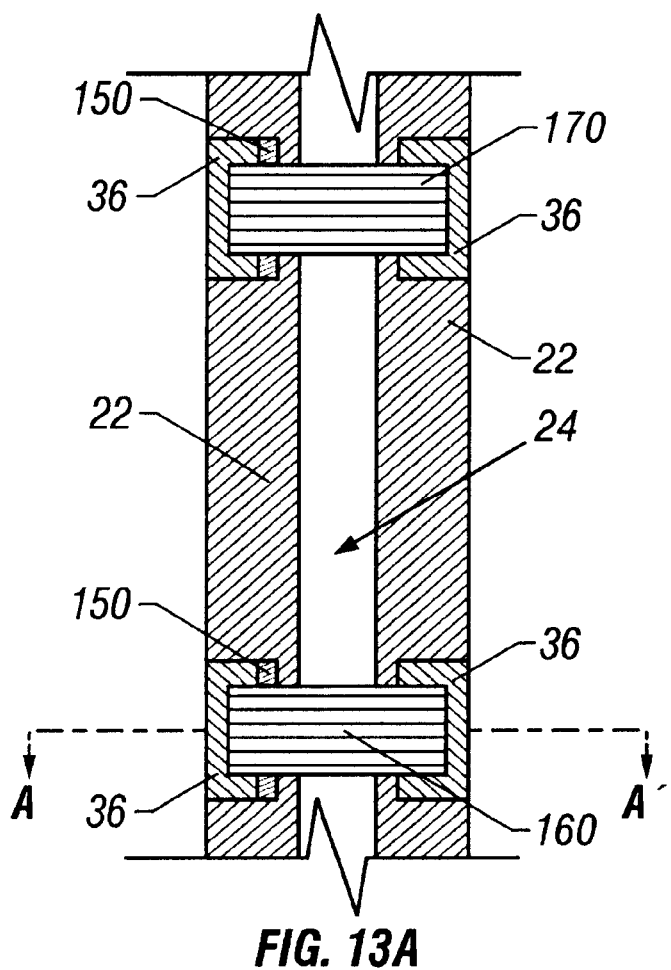
FIG. 13a is an axial cross sectional view of an alternate embodiment of the DAMD instrument of the present invention adapted for logging-while-drilling operations.
Figure 13B:
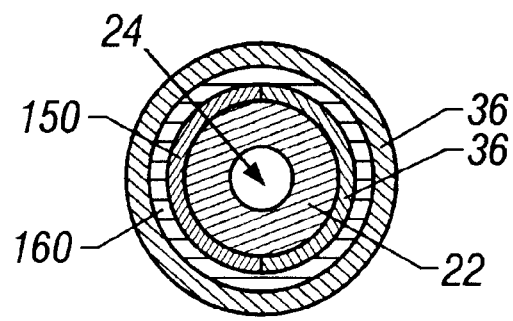
FIG. 13b is transverse cross sectional view of the transmitter coil of the alternate embodiment of the DAMD instrument of the present invention adapted for logging-while-drilling operations.

The basic concept of the induction instrument of this invention can also be embodied using other types of directionally sensitive coils and/or coil arrays. FIG. 13a, for example, is an axial cross sectional view of an induction coil arrangement suitable for LWD operations, and FIG. 13b is radial cross sectional view of the transmitter coil (at A–A' of FIG. 13a) of the arrangement shown in FIG. 13a. This embodiment provides only partial directional sensitivity, but can be made by very simple modification to LWD tools known in the art. A copper spacer 150 in the shape of a semi-cylindrical shell is placed between the transmitter coil 160 or the receiver coil 170 and the collar 22. The transmitter coil 160 and the receiver coil 170 may both be modified using a similar copper spacer to enhance directional sensitivity of the instrument, as shown in FIG. 13a. The coils and copper spacers may be imbedded in hard rubber or similar insulating material 36. Because the effective magnetic dipole moment of a coil is proportional to the cross-sectional area of the insulating material between the coil and the center conductor, the sensitivity of an instrument made as shown in FIG. 13a will be greatly reduced on the left hand side as shown in FIG. 13a. Information similar to that obtained using the first embodiment of the instrument of the invention can be obtained by subtracting measurements made at two different instrument azimuths at about 180 degrees separation. The embodiment of the instrument shown in FIGS. 13a and 13b when used as an LWD instrument would typically make measurements while the instrument housing is rotating. Orientation sensors (30' in FIG. 3a) such as would be included in a typical LWD/MWD instrument system enable determining the azimuthal orientation of the instrument at any time. Measurements of the azimuthal orientation can be combined with the measurements made by the receiver coil 170 to determine when the measurements made by the instrument in FIGS. 13a and 13b have been made approximately 180 degrees apart.

Referring back to the example wireline embodiment of the instrument having four circular-design coils as illustrated in FIG. 4b, is will be apparent that the cross-sectional area of each coil is not optimized with respect to the space available inside the instrument housing. As an example, if the maximum diameter of each coil 32', 33', 34' and 35' is about 0.54 inches, each coil will enclose and area of about 0.23 square inches per turn. Theoretically, for any particular instrument inside diameter and outside diameter, the maximum cross-sectional area per turn of an axially non-concentric coil is obtained using non-circular coils as shown in cross section in FIG. 14. These non-circular coils include an inner side having a radius substantially matched to the inner radius of the instrument, and an outer side having a radius substantially matched to the outer radius of the instrument housing. Non-circular coils 232–235 are azimuthally spaced at about 90 degrees from each other on a suitable mandrel 252 and are enclosed within a suitable sleeve 250. Each coil 232–235 is spaced at substantially the axial same position along the instrument from the transmitter coil (not shown in FIG. 14). If the inside diameter of the sleeve 25 is the same as the inside sleeve diameter shown in the circular coil array of FIG. 4b, the maximum area per turn will be about 0.63 square inches per turn, resulting in a corresponding increase in sensitivity as compared with the 0.23 square inches per turn obtained with the configuration of FIG. 4b.

Figure 14:
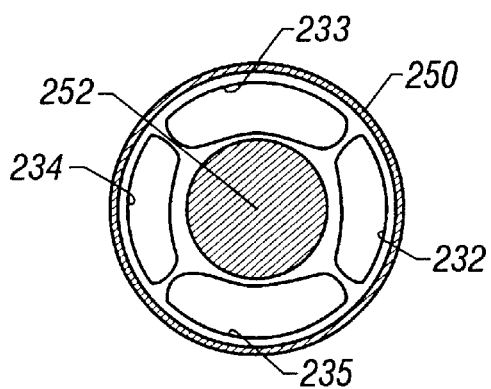
FIG. 14 is a sectional view of one example coil arrangement according to the invention using circularly wound coils.

Both the coil design in FIG. 4b and that in FIG. 14 have certain advantages as discussed previously, but also may have several shortcomings. By way of explanation of these possible shortcomings, first of all the coils must be mounted precisely and must maintain their relative axial and lateral positions under external hydrostatic pressure, high temperature, and bending stress encountered by the instrument when it is used in a wellbore. Second, wrapping the coils to make the instrument presents potential difficulties in that induction transmitter and receiver coils are typically wrapped under tension on a circular mandrel core (see FIG. 4b). As ambient temperature changes, the tension on the wire from the wrapping process tends to hold it in place in spite of different coefficients of thermal expansion of the wire and the coil mandrel. Conversely, the non-circular coil shape shown in FIG. 14 would be difficult to wind under tension. A coil with little internal wire tension is more likely to be subject to wire movement caused by changes in ambient temperature and/or pressure and mandrel bending, and as a result may undergo uncontrolled variations in coil sensitivity with respect to temperature, pressure and mandrel bending. Third, making electrical connections to relatively small cross-section, circular and non-circular coils, within the relatively small confines of a typical well logging instrument can be difficult. Finally, routing connecting wires from the coils to the control and signal processing electronics of the typical well logging instrument may result in parasitic capacitive or inductive coupling, as well as mechanical problems associated with the routing.

Figure 15A:
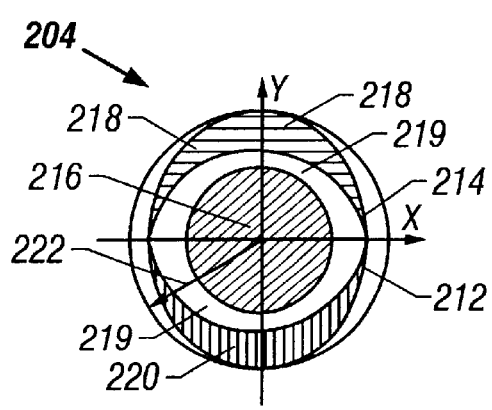
FIG. 15a is a view, in the x-y plane, of one example of a DAMD coil pair laterally displaced along the y-axis.

Some of the mechanical, electrical and sensitivity related shortcomings of the previously discussed multiple coil, axially coincident spaced DAMD receiver designs can be overcome using a pair of laterally displaced (eccentered) coils such as shown in FIGS. 15a, 15b, 16a and 16b. FIG. 15a is a top sectional view in the x-y plane of a pair 204 of relatively large diameter (large here meaning having a diameter not substantially smaller than the instrument diameter) coils 214 and 212, where the x-y origin represents the center of the instrument. The "upper" coil 214 is laterally displaced by a distance of +Δy, and the lower coil is displaced laterally by an equal, opposite distance of −Δy. Both coils 212, 214 are wound on a mandrel 216, and fit within a selected radius 222. The mandrel 216 preferably includes a substantially circular cross section where each of the coils 212, 214 is to be wound thereon, enabling the coils 212, 214 to be wound under tension using conventional coil winding equipment. The diameter of each coil 212, 214 is relatively large when compared with comparable multiple-coil arrangements discussed previously and shown in FIGS. 3b, 4b and 14. For mechanical strength, a gap between the coils 214 and 212 and the mandrel 216 is preferably about 0.1 inch, which provides spacing for a ceramic coil form. The coils 212 and 214 are wired in series opposition as in the previous embodiments. An overlap area 219 between the two coils 212, 214 does not materially contribute to the measurement made by the instrument (at least to the first order). The areas which do not fit within the overlap area 219 will be referred to a net upper coil area 218, and a substantially equal net lower coil area 220, as indicated in FIG. 15a. For any particular inside diameter of the instrument, the net upper 218 and lower 220 coil areas are considerably larger than the enclosed area of the multiple coil array shown in FIG. 4a, and are comparable to the enclosed area of the multiple coil array shown in FIG. 14. The coil arrangement 204 shown in the x-z plane in FIG. 15b clearly illustrates the ceramic coil form 213.

Figure 16A:
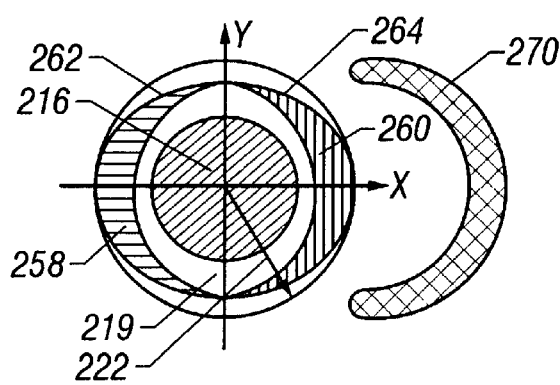
FIG. 16a is a view, in the x-y plane, of one example of a DAMD coil pair laterally displaced along the x-axis.

In order to obtain the preferred degree of azimuthal definition in a wireline instrument configuration, a second, orthogonally laterally displaced, coil pair 205 may be used, as is illustrated as a sectional view in the x-y plane in FIG. 16a. For the second coil pair 205, the upper coil 262 is laterally displaced a distance of −Δx, and the lower coil 262 is laterally displaced a distance of +Δx. The net upper coil area 258 and a net lower coil area 260 are preferably equal in size to the net upper and lower coil areas 218 and 220 for the y-displaced (first) coil pair, respectively, shown in FIG. 15a. at 204.

Figure 16B:
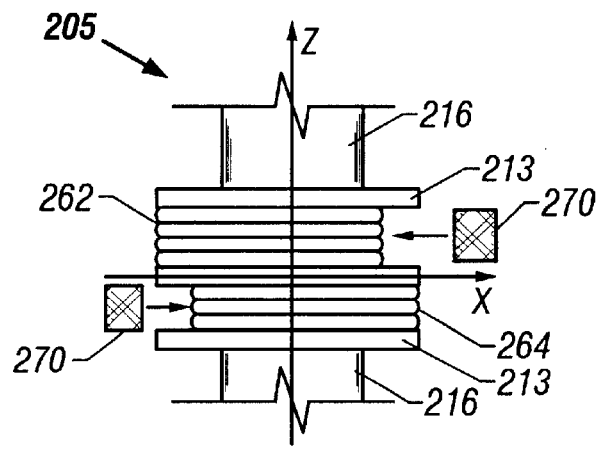
FIG. 16b is a view, in the x-z plane, of one example of a DAMD coil pair laterally displaced along the x-axis.
Figure 15B:
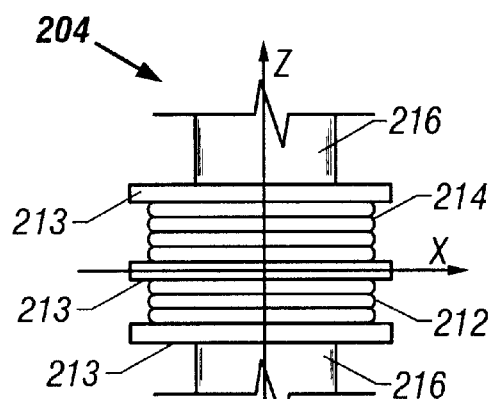
FIG. 15b is a view, in the x-z plane, of one example of a DAMD coil pair laterally displaced along the y-axis.

The second coil pair 205 is shown in the x-z plane in FIG. 16b, clearly illustrating the lateral displacement of the upper coil 262 and the lower coil 264 with respect to the axis of the mandrel 216 (or the transmitter) and ceramic coil form 213. Crescent shaped ceramic inserts 270 can be used for additional support of the ceramic coil forms 213 (See FIGS. 16a and 16b). The ceramic coil forms 213 may be held in place by any suitable form of axial compressive loading on a sensor array stack within the instrument. This helps prevent coil movement during thermal and environmental loading of the logging instrument. Because the individual coils are relatively large in diameter, mechanical and electrical connection problems encountered with previously discussed directional coil sensors using smaller coils are minimized.

Figure 17:
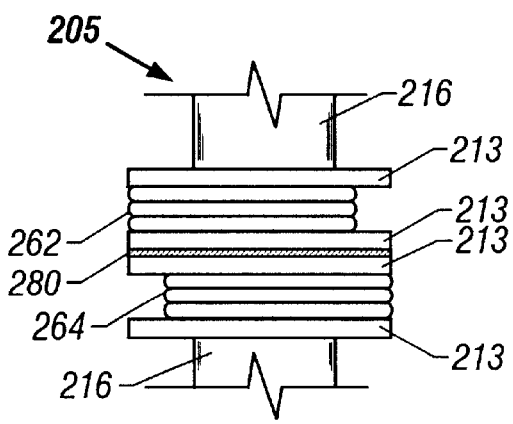
FIG. 17 shows one example of a coil form which can be used with any of the laterally displaced coil arrangements of FIGS. 15a, 15b, 16a and 16b.

The number of turns on each of the laterally displaced coils in each of this type of DAMD receiver will typically not be identical, because each of the coils is spaced at a different axial distance from the transmitter. For example, suppose that the first coil is axially spaced 33 inches from the transmitter, and the second coil is spaced at 34 inches from the transmitter. The signal strength for the direct, mutually coupled signal varies with the axial spacing (L) as $L^{-3}$, so the second coil requires more turns by the ratio $(33/34)^{-3}=1.094$ to maintain comparable amplitude in each coil. It may be sufficient to simply wrap the required number of turns on the coil forms. If better cancellation of the direct, mutually coupled signal is required, that degree of fine tuning can be accomplished, for example, by placing shims 280 between the coils as shown in FIG. 17. An alternate method of tuning is to move both coils either closer to, or farther from the transmitter, using shims in the overlapping, non active region of the coils. In this case, a one-piece ceramic coil form may contain both individual coils.

The two coil receiver set as shown in FIGS. 15*a*, 15*b*, 16*a* and 16*b* will have a small real signal component (R) in a homogeneous formation because the two coils are at slightly different axial distances from the transmitter. This R signal component can be subtracted out, for example, by using the response of a conventional, axially-centered induction receiver (or array of such receivers).

Figure 18:
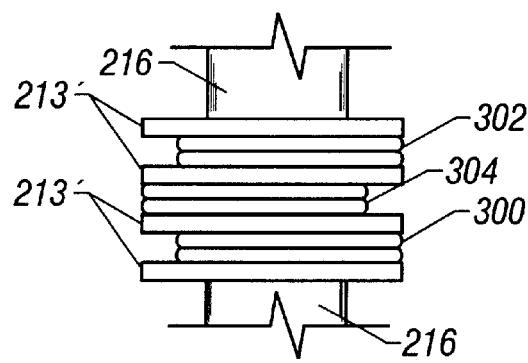
FIG. 18 shows an alternative arrangement of coils which may be used with the invention.
Figure 19:
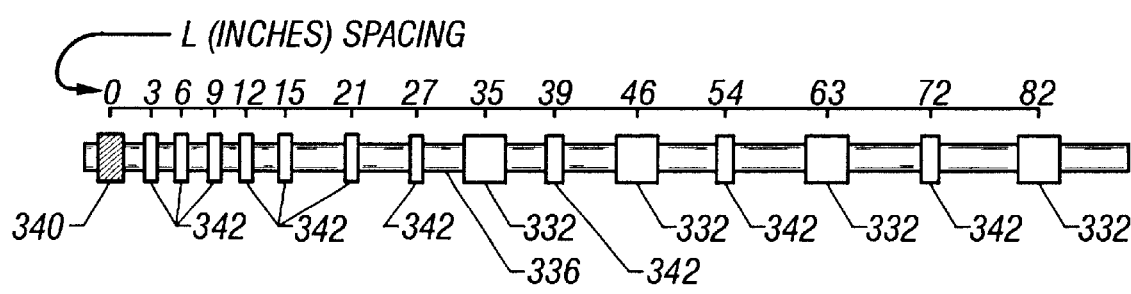
FIG. 19 shows an induction array, including conventional induction transmitter and receiver coils, and one example of DAMD receiver coils.

Yet another alternative, directionally sensitive DAMD coil design, shown in FIG. 18, includes an upper coil 302 and a lower coil 306 wired in series, and a middle coil 304 wired in series opposition to the two other coils 306, 308. The three coils cancel the direct, mutually coupled signal, and any signal from a homogeneous formation. An induction tool with interleaved DAMD receiver coils 332, and conventional, axially centered induction receiver coils 342 is shown in FIG. 19. A conventional induction transmitter 340 is shown at a reference (z=0.0 inches), and the axial spacing from the transmitter, L, in inches, of each of the receiver coils is indicated above the mandrel 336. Additional DAMD receivers could be placed to the left of the transmitter 340 for shallower DAMD measurements. The DAMD and conventional receivers in this embodiment may be separated by ceramic spacers (not shown).

Figure 20:
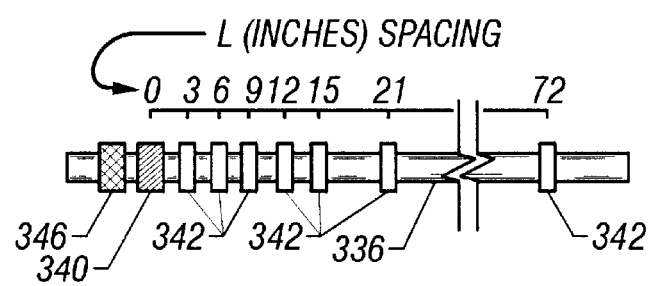
FIG. 20 shows one example of an induction array including a conventional transmitter coil, an example of a DAMD transmitter coil, and an array of conventional induction receiver coils.

A second type of induction tool array is shown in FIG. 20. A DAMD transmitter 346 is placed on the mandrel 336 near a conventional, axially centered induction transmitter coil 340. The DAMD transmitter 346 in this embodiment consists of two pairs of inverse-series connected, laterally displaced coils, similar to the arrangement shown for example in FIG. 4*b*. The other arrangements for DAMD coils shown in this specification will also work in this embodiment of the invention. The DAMD transmitter 346 works by the theory of reciprocity, which states that the same effective measurement may be obtained by reversing the roles of the transmitter and receiver coils in an induction array. The induction instrument in this embodiment includes an array of receiver coils, 342, which in this embodiment may be conventional, axially centered, axial magnetic dipole (AMD) induction receivers. Such an arrangement of conventional receivers and conventional induction transmitter is described in U.S. Pat. No. 5,668,475, for example. The DAMD transmitter 346 and the conventional induction (AMD) transmitter 340 are alternately energized. When the conventional AMD transmitter 340 is energized, the receivers 342 measure conventional, axial magnetic dipole signals. When the DAMD transmitter 346 is energized, the receivers 342 detect azimuthally sensitive DAMD signals. The receiver coils 342 in this embodiment comprise main/bucking coil pairs, the DAMI signals tend to cancel any direct mutually coupled signal from the DAMD transmitter 346. In FIG. 20, the conventional AMD transmitter 340 is shown at the origin (z=0.0 inches), and the spacing L of each of the other coils, such as receivers 342, is indicated by the numerals above the mandrel 336.

Additional DAMD receiver coils (not shown) could also be placed to the left of the DAMD transmitter 346 for laterally shallower DAMD measurements, if desired. As previously explained, the DAMD and conventional (AMD) induction coils may be separated by ceramic spacers.

The differential axial magnetic dipole ("DAMD") arrangement of the present invention provides directional information required for geosteering without extreme sensitivity of the measurements to conditions in the wellbore. In the DAMD arrangement, the transmitter and receiver coils are oriented with the coil axes substantially parallel to the axis of the instrument, which avoids undesirable amounts of borehole effect as for the TILT, TMD and CROSS instruments described in the Background section herein.

Certain preferred embodiments of the invention are described herein, but variations of the invention that are fully within the spirit and scope of the invention will occur to those skilled in the art. The scope of the invention is therefore determined only by the claims that follow.

What is claimed is:

1. An induction logging instrument, comprising:
    an elongated support adapted for conveyance within a subsurface wellbore;
    at least one induction transmitter disposed on said support and arranged as an axial magnetic dipole; and
    at least one induction receiver disposed on said support and arranged as a differential axial magnetic dipole, wherein each axial magnetic dipole of said induction receiver disposed at the same selected axial distance from the at least one induction transmitter.

2. The induction logging instrument as defined in claim 1 wherein the at least one differential axial magnetic dipole induction receiver comprises a pair of coils, each coil in the pair wound on an axis substantially parallel to an axis of the at least one transmitter, the axis of each of the coils displaced from the axis of the at least one transmitter by a substantially equal lateral distance and in opposite directions with respect to the transmitter axis, each of the pair of coils disposed at substantially the same axial position along the instrument, the coils in the pair connected to circuitry adapted to determine a difference between signals induced in each of the coils in the pair.

3. The induction logging instrument as defined in claim 1 wherein the at least one differential axial magnetic dipole induction receiver comprises two pairs of coils, each coil in each of the pairs wound on an axis substantially parallel to an axis of the at least one transmitter, each coil axis in each of the pairs displaced from the transmitter axis by a substantially equal lateral distance and in opposite directions with respect to the transmitter axis, the pairs substantially azimuthally orthogonal to each other, each of the coils disposed at substantially the same axial position along the instrument.

4. The induction logging instrument as defined in claim 3 further comprising means for weighting a response of each of the coils by cos α, sin α, −cos α, and −sin α, respectively, with respect to a selected direction, whereby the selected direction is determined when α provides a maximum positive response, the selected direction representing an azimuthal angle defined in a plane perpendicular to the axis of the instrument.

5. The induction logging instrument as defined in claim 4 wherein the at least one differential axial magnetic dipole induction receiver comprises coils each wound in a substantially circular cross-section having a diameter selected to fit within an annular space between an outer diameter and an inner diameter of the well logging instrument.

6. The induction logging instrument as defined in claim 4 wherein the at least one differential axial magnetic dipole induction receiver comprises coils each wound in a substantially annular sector cross-section, each annular sector having an outer radius selected to substantially match an outer radius of the logging instrument and an inner radius selected to substantially match an inner radius of the logging instrument, so as to maximize an area enclosed by each of the coils.

7. The induction logging instrument as defined in claim 4 wherein the at least one differential axial magnetic dipole induction receiver comprises substantially circular coils wound to fit within and circumscribe an annular space between an outer diameter and an inner diameter of the logging instrument, each of the receiver coils disposed at a selected axial distance from the at least one transmitter and laterally displaced by an equal and substantially opposite distance with respect to each other from an axis of the at least one transmitter.

8. The induction logging instrument as defined in claim 7 wherein the substantially circular coils are wound under tension on a coil form to substantially maintain coil shape over a range of ambient temperatures, ambient pressures and bending of the logging instrument.

9. The induction logging instrument as defined in claim 8 wherein an enclosed area of each of the substantially circular coils is selected to provide a substantially equal signal output as the other ones of the coils, to account for the selected axial position of each of the substantially circular coils.

10. The induction logging instrument as defined in claim 1 wherein the at least one differential axial magnetic dipole induction receiver comprises:
   a pair of coils, each coil wound on an axis substantially parallel to an axis of the at least one transmitter, each of the coil axes displaced from the axis of the at least one transmitter by a substantially equal lateral distance and in the same direction with respect to the transmitter; and
   a third coil disposed between the pair of coils and displaced a substantially equal lateral distance an in an opposite direction to the pair of coils, the pair of coils and third coil interconnected in series, each of the pair of coils and the third coil defining an enclosed area related to its axial distance from the transmitter, whereby the pair of coils and third coil are substantially mutually balanced.

11. The induction logging instrument as defined in claim 1 further comprising at least one axial magnetic dipole induction receiver disposed at a selected axial distance from the at least one induction transmitter, the at least one axial magnetic dipole receiver being substantially coaxial with the at least one induction transmitter.

12. The induction logging instrument as defined in claim 11 further comprising an array of axial magnetic dipole induction receivers disposed at selected axial positions along the instrument, each of the axial magnetic dipole receivers being substantially coaxial with the at least one induction transmitter.

13. The induction logging instrument as defined in claim 1 further comprising an array of differential axial magnetic dipole induction receivers each disposed at a selected axial position along the instrument.

14. The induction logging instrument as defined in claim 1 wherein the at least one transmitter and the at least one receiver are disposed in a support forming part of a logging-while-drilling apparatus.

15. The induction logging instrument as defined in claim 1 wherein the at least one transmitter and the at least one receiver are disposed on a support adapted to be conveyed into a wellbore on an electrical cable.

16. The induction logging instrument as defined in claim 1 further comprising an orientation measuring instrument adapted to determine an orientation of the induction logging instrument with respect to a selected reference.

17. An induction logging instrument, comprising:
   an elongated support adapted for conveyance within a subsurface wellbore;
   at least one induction transmitter disposed on said support and arranged as a differential axial magnetic dipole; and
   at least one induction receiver disposed on said support and arranged as an axial magnetic dipole, the at least one induction receiver disposed at the same selected axial distance from each axial magnetic dipole of said induction transmitter.

18. The induction logging instrument as defined in claim 17 wherein the at least one induction transmitter comprises a pair of coils, each coil wound on an axis substantially parallel to an axis of the at least one induction receiver, each of the induction transmitter coil axes displaced from the axis of the induction receiver by a substantially equal lateral distance and in opposed directions with respect to each other, each of the pair of coils in the induction transmitter disposed at substantially the same axial position along the instrument.

19. The induction logging instrument as defined in claim 17 wherein the at least one induction transmitter comprises two pairs of coils, each coil in each of the pairs wound on an axis substantially parallel to an axis of the at least one induction receiver, each coil axis in each of the pairs displaced from the axis of the at least one induction receiver by a substantially equal lateral distance in opposed directions with respect to the induction receiver axis, the pairs substantially azimuthally orthogonal to each other, each of the induction transmitter coils disposed at substantially the same axial position along the instrument.

20. The induction logging instrument as defined in claim 19 further comprising means for weighting a response of each of the induction transmitter coils by $\cos \alpha$, $\sin \alpha$, $-\cos \alpha$, and $-\sin \alpha$, respectively, with respect to a selected direction, whereby the selected direction is determined when $\alpha$ provides a maximum positive response, the selected direction representing an azimuthal angle defined in a plane perpendicular to the axis of the instrument.

21. The induction logging instrument as defined in claim 20 wherein the at least one induction transmitter comprises coils each wound in a substantially circular cross-section having a diameter selected to fit within an annular space between an outer diameter and an inner diameter of the well logging instrument.

22. The induction logging instrument as defined in claim 20 wherein the at least one induction transmitter comprises coils each wound in a substantially annular sector cross-section, each annular sector having an outer radius selected to substantially match an outer radius of the logging instrument and an inner radius selected to substantially match an inner radius of the logging instrument, so as to maximize an area enclosed by each of the coils.

23. The induction logging instrument as defined in claim 20 wherein the at least one induction transmitter comprises substantially circular coils wound to fit within and circumscribe an annular space between an outer diameter and an inner diameter of the logging instrument, each of the induction transmitter coils disposed at a selected axial distance from the at least one receiver and laterally displaced by a substantially equal distance and in a substantially opposite direction with respect to an axis of the at least one induction receiver.

24. The induction logging instrument as defined in claim 23 wherein an area enclosed by each one of the induction transmitter coils is selected so that a sensitivity of each coil is substantially the same as the sensitivity of the other ones of the induction transmitter coils in respect of the selected axial distance between each of the transmitter coils and the at least one induction receiver.

25. The induction logging instrument as defined in claim 24 wherein the substantially circular coils are wound under tension on a coil form to substantially maintain coil shape over a range of ambient temperatures, ambient pressures and bending of the logging instrument.

26. The induction logging instrument as defined in claim 17 wherein the at least one induction transmitter comprises:
    a pair of coils, each coil wound on an axis substantially parallel to an axis of the at least one induction receiver, each of the coil axes displaced from the axis of the at least one induction receiver by a substantially equal lateral distance and in a same direction with respect to the axis of the at least one induction receiver; and
    a third coil disposed between the pair of coils and laterally displaced from the axis of the receiver by a same distance an in a direction opposite to the pair of coils, the pair of coils and the third coil be connected in series and each having sensitivity related to its respective axial separation from the induction receiver so as to be substantially mutually balanced.

27. The induction logging instrument as defined in claim 17 further comprising at least one axial magnetic dipole induction transmitter disposed at a selected axial distance from the at least one induction receiver, the at least one axial magnetic dipole transmitter being substantially coaxial with the at least one induction receiver.

28. The induction logging instrument as defined in claim 27 further comprising an array of induction receivers disposed at selected axial positions along the instrument, each receiver in the array substantially coaxial with the at least one transmitter, whereby differential axial magnetic dipole array signals are measured by the array of receivers when the at least one differential axial magnetic dipole transmitter is energized, and wherein axial magnetic dipole array signals are measured when the at least one axial magnetic dipole transmitter is energized.

29. The induction logging instrument as defined in claim 17 further comprising an orientation measuring instrument adapted to determine an orientation of the induction logging instrument with respect to a selected reference.

30. A method for determining a position of a wellbore with respect to boundaries of a formation in which the wellbore is drilled, comprising:
    measuring differential axial magnetic dipole electromagnetic induction signals from the formation at azimuthally spaced apart positions around the wellbore, the measurements each having a measurement of rotary orientation corresponding thereto; and
    determining which one of the boundaries is being approached by the wellbore from the measurements of differential magnetic dipole electromagnetic induction and corresponding rotary orientation.

31. The method as defined in claim 30 wherein the making the differential axial magnetic dipole measurements comprises:
    inducing an electromagnetic field in the formation;
    making electromagnetic induction voltage measurements in at least one differential axial magnetic dipole receiver at an axially spaced apart location from a position at which the field is induced; and
    rotating an instrument having the at least one differential axial magnetic dipole receiver therein within the wellbore while making the measurements.

32. The method as defined in claim 30 wherein the making differential axial magnetic dipole induction measurements comprises:
    inducing an electromagnetic field in the formations surrounding the instrument at a transmitter location; and
    detecting a differential axial magnetic dipole signal at at least one spaced apart position along the wellbore from the transmitter location.

33. The method as defined in claim 32 wherein the detecting comprises:
    measuring induced voltage differential in two detectors laterally equally and oppositely displaced from a lateral position of the transmitter location; and
    rotating the detectors about an axis defining the lateral position of the transmitter location.

34. The method as defined in claim 32 wherein the detecting comprises:
    measuring voltages induced in a plurality of detectors laterally equally and circumferentially disposed from a lateral position of the transmitter location; and
    assigning weighting factors to the measurements of voltage induced in each of the detectors, the weighting factor depending on an angle subtended between an axis of the wellbore and a plane of at least one of the boundaries, the angle selected to provide a maximum positive value of the voltages from the plurality of detectors.

35. The method as defined in claim 32 wherein the measuring is performed while drilling the wellbore.

36. The method as defined in claim 35 further comprising:
    adjusting a trajectory of the wellbore in response to determination of which of the boundaries is being approached; and
    further drilling the wellbore along a selected target formation.

37. The method as defined in claim 32 further comprising:
    adjusting a trajectory of the wellbore in response to determination of which of the boundaries is being approached; and
    further drilling the wellbore along a selected target formation.

38. The method as defined in claim 32 wherein the making the differential axial magnetic dipole induction measurements comprises:
    inducing a differential axial magnetic dipole electromagnetic field in the formations surrounding the instrument at a transmitter location; and
    detecting an induced signal in at least one axial magnetic dipole receiver at a selected spaced apart position along the wellbore from the transmitter location.

39. The method as defined in claim 38 wherein the inducing comprises:
    passing alternating current through two axial magnetic dipole elements laterally equally and oppositely displaced from a lateral position of the receiver location; and
    rotating the dipole elements about an axis defining the lateral position of the at least one receiver location.

40. The method as defined in claim 38 wherein the inducing comprises:
    passing alternating current through a plurality of axial magnetic dipole elements laterally equally and circumferentially disposed from a lateral position of the receiver location; and assigning weighting factors to the current passed through each of the dipole elements, each of the weighting factors depending on an angle subtended between an axis of the wellbore and a plane of at least one of the boundaries, the angle selected to provide a maximum positive value of the voltages from the receiver.

41. An electromagnetic induction apparatus for determining whether a wellbore is approaching an upper or a lower boundary of a target earth formation, comprising:

at least one transmitter coil;

at least one receiver coil, at least one of the transmitter and receiver having disposed with a cross-section thereof a copper spacer subscribing an arc of at most 180 degrees, the copper spacer disposed on one side of an axis of the at least one of the transmitter and receiver, a remainder of the cross-section having insulating material therein, the copper spacer adapted to produce azimuthally dependent sensitivity in the at least one of the transmitter and receiver; and an orientation measuring instrument coupled to a housing including therein the at least one transmitter and the at least one receiver, so that an orientation of azimuthally sensitive measurements made by the induction apparatus is determinable with respect to a geographic reference.

42. The apparatus as defined in claim 41 wherein the at least one transmitter, the at least one receiver and the orientation measuring instrument are disposed within a drill collar forming part of a logging-while-drilling instrument.

* * * * *